Patented Oct. 27, 1931

1,829,046

UNITED STATES PATENT OFFICE

WILBUR A. LAZIER, OF ELMHURST, DELAWARE, ASSIGNOR TO E. I. DU PONT DE NEMOURS & COMPANY, OF WILMINGTON, DELAWARE, A CORPORATION OF DELAWARE

CATALYTIC PROCESS OF HYDROGENATING AND DEHYDROGENATING CARBON COMPOUNDS

No Drawing.   Application filed December 21, 1929.   Serial No. 415,832.

This invention relates to catalytic processes, and more particularly to a process of carrying out catalytic reactions by passing reactive gas mixtures at suitable temperatures and pressures over highly efficient chromite catalysts prepared by heating multiple chromates of metals and nitrogen bases to convert hexavalent chromium into trivalent chromium with the formation of chromites.

This application is a continuation in part of my co-pending application Serial No. 115,692 filed June 12, 1926.

Numerous mixtures and combinations containing oxides of chromium and other metals have been made and used as catalysts in various processes. Such mixtures have been prepared in many different ways, but those prepared by heating have generally been reduced with hydrogen, since it has been found in the past that heating the usual oxide catalysts to high temperatures destroys their catalytic activity.

I have found that catalytic reactions may be carried out by passing a reactive gas mixture containing a carbon compound, at suitable temperatures and pressures, over a chromite catalyst prepared by slightly heating an exothermic multiple salt containing hexavalent chromium, a hydrogenating metal, and a nitrogen base, and allowing the decomposition to thereafter proceed spontaneously.

This invention has as an object to carry out catalytic processes by the use of highly efficient chromite catalysts. A further object is to carry out such catalytic processes by the use of chromite catalysts prepared by slightly heating exothermic multiple salts of hydrogenating metals and nitrogen bases. It is a specific object to carry out such processes by the use of catalysts derived from double chromates of ammonia and manganese. Other objects will appear hereinafter.

The following specific examples are given by way of illustration but are not to be regarded as a limitation of my invention:

*Example 1.*—Manganese ammonium chromate is prepared by precipitation as the result of mixing solutions containing molecular equivalents of manganese nitrate and ammonium chromate. When heated slightly to start the reaction, this basic double salt decomposes spontaneously with the evolution of sufficient heat to leave a glowing residue which probably consists of combined manganese oxide and chromium sesquioxide.

One liter of such a catalyst, when placed in a pressure resisting copper lined tube yields 800 cc. of crude condensate per hour containing about 50% methanol and 25% alcohols of higher molecular weight when the reaction is carried out at about 400° C. and about 300 atmospheres pressure using a gas consisting of about 30% carbon monoxide and about 60% hydrogen, when the gas mixture is passed through the catalyst at a space velocity of about 10,000 liters per hour as measured at normal temperature and pressure.

*Example 2.*—245 grams of manganese acetate are dissolved in 500 cc. of water and precipitated with a solution of 152 grams of neutral ammonium chromate in 500 cc. of water. After washing and drying the precipitate is impregnated with a solution of 15 grams of potassium oxalate and again dried. The dry mass containing manganese ammonium chromate and potassium oxalate is then heated to 400° C. whereupon the double chromate is spontaneously decomposed, the hexavalent chromium being converted substantially to the trivalent form with the evolution of ammonia, water vapor, oxides of nitrogen and other gases. The ignited material is then compressed into tablets of suitable size for use as catalytic material.

Water gas containing about 35% carbon monoxide and about 49% hydrogen is passed over the above described contact mass at 450° C. and 280 atmospheres pressure and at a space velocity of about 10,000 liters of gas per liter of catalyst per hour, the gas being measured at about atmospheric pressure and 20° C., there is obtained per unit volume of catalyst per hour 0.66 volumes of crude condensate containing about 35% methanol and 30% higher alcohols.

*Example 3.*—A solution containing 190 grams of zinc nitrate and 18 grams of manganese nitrate is precipitated at 20° C. with a solution containing 167 grams of neutral ammonium chromate and 45 cc. of ammonium hydroxide. The mixed precipitate containing zinc ammonium chromate and manganese ammonium chromate is filtered, dried without washing, and heated to 400° C. thereby causing it to decompose exothermically, resulting in a 30-40% loss in weight.

When suitably granulated and used as a contact mass for the synthesis of methanol from water gas of approximately the composition stated in Example 2, good yields are obtained at a space velocity of 20,000 and at a pressure of 267 atmospheres. Under these conditions there is obtained at 350° C. 130 cc. of crude condensate containing 92% of methanol for every 100 cc. of catalyst employed. At 450° C. the yield is 108 cc. of condensate containing 69% methanol and 18% higher alcohols.

*Example 4.*—A chromate of manganese containing also ammonium chromate is prepared by precipitating manganese nitrate with a solution of neutral ammonium chromate or its equivalent of ammonium bichromate and ammonia. After impregnating the dry chromate with 15% of its weight of potassium carbonate, the mixture is heated to 400° C. at which temperature the chromate spontaneously breaks down to chromite with evolution of heat and gases.

The granular residue may be employed for the synthesis of methanol and higher alcohols under widely different conditions. The results tabulated below are obtained when employing water gas containing 31% carbon monoxide and 47% hydrogen. The yield of crude condensate is given in cc. per 100 cc. of catalyst per hour:

| Condition No. | Temperature °C. | Pressure atm. | Space velocity | Yield of condensate | Composition of condensate | |
|---|---|---|---|---|---|---|
| | | | | | Per cent methanol | Per cent higher alcohols |
| 1 | 430 | 279 | 40,000 | 82 | 38 | 21 |
| 2 | 450 | 279 | 40,000 | 90 | 45 | 23 |
| 3 | 470 | 279 | 40,000 | 106 | 32 | 23 |
| 4 | 420 | 500 | 40,000 | 176 | 47 | 27 |
| 5 | 468 | 500 | 40,000 | 174 | 32 | 32 |
| 6 | 475 | 700 | 55,000 | 232 | 44 | 29 |
| 7 | 425 | 900 | 40,000 | 152 | 35 | 28 |

*Example 5.*—60 cc. of 95% ethyl alcohol were passed over 10 cc. of a catalyst prepared as in Example 1 and at a temperature of 400° C. and substantially atmospheric pressure. There was obtained approximately 50% conversion to acetaldehyde and hydrogen and about 5% conversion of the ethyl alcohol to ethyl acetate by dehydrogenation.

The term space velocity as used in the above examples may be defined as the volume of gas mixture, measured at approximately 20° C. and about atmospheric pressure, passed over the catalyst per unit volume of catalyst per hour. It is, of course, understood that the space velocity as here used is the velocity of the gases at the exit end of the apparatus in which the process is being carried out.

It will of course be understood that the specific operating conditions, such as space velocities, temperatures, and pressures may be varied within wide limits within the scope of my invention, depending on the type of reaction catalyzed and the product desired. For example, certain dehydrogenation reactions may be carried out at approximately atmospheric pressure and elevated temperature. On the other hand, it may be desirable to use both high pressures and temperatures as in the formation of higher alcohols.

Although ammonium compounds of manganese and chromium have been given in the above examples, compounds of organic bases, such as manganese bichromate tetrapyridine, and other organic derivatives such as salts of aniline and methyl amine, may be employed and when heated these compounds behave in a manner similar to the ammonium derivatives and yield manganese chromites possessing the same catalytic properties.

In addition, it has been found that the activity of the chromite catalysts, prepared according to the present process, may be improved still further if the ignited product is treated to remove the less active substances present in such product, which substances are not combined in the form of chromite and are of low catalytic activity. These undesirable substances may be removed in any suitable way, such as by leaching the calcined product with a weak acid, e. g., acetic acid in concentrations of about 5-10%.

The chromites made as described are stable and are substantially insoluble in water and in weak acids. The preparation of the catalysts, according to the present process, results in the formation of catalytic bodies of great porosity, which, after drying, consist of nearly pure, highly stable chromites substantially free from acid soluble oxides or other substances of low catalytic activity. These chromite catalysts are highly stable and do not lose their activity after use in a catalytic process. For instance, manganese chromite, which has been prepared as just described and was leached with acid prior to its use as a catalyst, is found to contain no additional acid soluble manganese after using the manganese chromite as a catalyst. The present catalysts have the further advantage that they are not affected by use at high temperatures.

As has been pointed out, the active catalysts forming the subject of the present invention are chromite compounds containing chromium in the trivalent form. However, the term chromite, as here used, does not necessarily refer to a compound of definite chemical composition since the chromite may contain widely differing proportions of its components. Manganese chromites, for example, are known to contain a varying proportion of manganese oxide, and this proportion is dependent on the ratio of manganese to chromium in the compound or mixture of compounds calcined and upon the temperature and duration of the calcination. In any event, the chromites contain the chromium in trivalent form.

The present catalysts contain chromium sesquioxide combined with oxides of other elements, i. e., as the chromites, and are suitable for general use in all of the catalytic processes in which chromium oxide mixed with other oxides is used as the catalyst. For instance, the chromite catalysts are suitable for use in the high pressure synthesis of oxygenated organic compounds such as methanol and alcohols of higher molecular weight from mixtures of hydrogen and oxides of carbon. The chromite catalysts may also be used for the water gas reaction wherein carbon monoxide and water vapor are converted catalytically to carbon dioxide and hydrogen; or the catalysts may be used for dehydrogenations such as the catalytic conversion of an alcohol to an aldehyde.

Although the manganese chromites of this invention are highly efficient catalysts for the production of alcohols such as methanol and also for the production of higher alcohols, the proportion of higher alcohols formed may be increased by the addition to the catalyst composition of certain promoting substances, such as compounds of the alkali metals. The modification of the catalyst by the addition of these alkali compounds will, of course, depend largely upon the product or products desired.

Various elements may be combined with trivalent chromium oxide to form chromites which are suitable for use as catalysts. Manganese has already been mentioned as an example of the basic elements which, combined with chromium oxide to form chromites, are extremely valuable catalysts, particularly when used for methanol synthesis. In place of manganese any one of that group of elements, which, either in the form of the finely divided metals or in the form of the oxides, constitute active catalysts for the methanol synthesis, or for other reactions, may be combined with chromium oxide to form the corresponding chromite. Included in this group of metals, which may be designated the "hydrogenating metals", are zinc, copper, cadmium, manganese, silver and iron.

In the various embodiments of the present invention, including the various methods of preparing chromite catalytic bodies, any one of these hydrogenating metals may be used as the more basic element to form the chromite; or, if desired, several of these metals may be used to form mixtures of the desired chromites.

As many apparent and widely different embodiments of this invention may be made without departing from the spirit and scope thereof, it is to be understood that I do not limit myself to the specific embodiments thereof except as defined in the appended patent claims.

I claim:

1. In a catalytic process of forming organic compounds in a three-component reaction system comprising an oxygen-containing carbon compound capable of hydrogenation, an oxygen-containing carbon compound capable of dehydrogenation, and hydrogen, the step which comprises passing the reactants over a heated catalyst prepared by igniting an exothermic double chromate of a nitrogen base and manganese.

2. The process of claim 1 in which the catalyst is prepared by igniting an exothermic double chromate of ammonia and manganese.

3. The process described in claim 1 in which the catalyst described therein has been modified by the addition thereto of an alkali metal compound.

4. The process described in claim 1 in which the catalyst described therein, is leached with a weak acid, after ignition, whereby to remove the less active substances present in the ignited catalyst.

5. In a catalytic process of forming organic compounds in a three-component reaction system comprising an oxygen-containing carbon compound capable of hydrogenation, an oxygen-containing carbon compound capable of dehydrogenation, and hydrogen, the step which comprises passing the reactants over a catalyst prepared by igniting an exothermic double chromate of a nitrogen base and manganese, said catalyst being heated to a temperature of at least 350° C.

6. The process of catalytically synthesizing methanol from a mixture of carbon monoxide and hydrogen which comprises passing the reactants at a temperature of about 350–475° C. and at a pressure of about 279–900 atmospheres over a catalyst prepared by heating a double chromate of a nitrogen base and manganese to its spontaneous decomposition temperature.

7. The process of claim 6 in which the catalyst is prepared by heating a double chromate of ammonia and manganese to its spontaneous decomposition temperature.

In testimony whereof I affix my signature.

WILBUR A. LAZIER.